3,355,513
MESOMORPHIC PHASE POLYMERS
Charles Sadron, Gilles Finaz, and Antoine Skoulios, Strasbourg, France, assignors to Centre National de la Recherche Scientifique, Ministere de l'Education Nationale Republique Francaise, Paris, France
No Drawing. Filed Apr. 24, 1962, Ser. No. 210,604
Claims priority, application France, Apr. 27, 1961, 860,082
19 Claims. (Cl. 260—857)

This invention relates to the mesomorphic phase polymers. The invention more particularly relates to a physically rigid polymer structure which retains the molecular configuration of a mesomorphic phase gel and to processes for obtaining such structures.

It is known that if gel systems are formed from graft polymers in a solvent phase in which the polymeric units forming the graft copolymer have a differential solubility that the polymer portion of the copolymer most soluble will concentrate in the solvent phase and the polymer portion of the copolymer least soluble will concentrate as layers, cylinders, or spheres. Thus, if a graft copolymer formed of sequentially arranged polymer units A and B is gelled in a solvent in which the homopolymer A would be relatively soluble and the homopolymer B would be difficultly soluble, then the portions of the copolymer corresponding to the polymeric units A concentrate in the solvent phase and the portion of the copolymer corresponding to the polymeric units B concentrate together in the form of layers, cylinders, or spheres. The gels having this molecular arrangement are said to possess a mesomorphic structure which is characterized by bifringence.

While the mesomorphic structure is extremely interesting per se from a theoretical viewpoint and the particular molecular orientation of this structure if obtainable in commercially utilizable polymer forms would offer extremely interesting possibilities for varying the physical and optical characteristics of the polymers, this form has hithertofore only been available in connection with loose gels which do not possess sufficient physical rigidity and strength to be useful for commercial and technical purposes.

It is an object of this invention to obtain the mesomorphic phase molecular structure in a polymer form of sufficient physical rigidity to render the same commercially and technically useful.

A further object of this invention is the conversion of mesomorphic phase gels to a physically rigid form. These and still further objects will become apparent from the following description:

It will be helpful for a better understanding of the invention to first review in somewhat greater detail certain technical aspects of mesomorphic phase structures. The polymers which are capable of being molecularly arranged into a mesomorphic phase structure may be generically referred to as sequenced copolymers. The term is intended to designate a copolymer structure formed of two or more alternately positioned polymer blocks. These blocks may be joined together head to tail as true block copolymers or may be joined as branches on a main polymer trunk as graft copolymers. Considering a copolymer formed from the polymeric units $A(x)$ and $B(x)$, the block copolymer has the form $A(x)$—$B(x)$—$A(x)$—$B(x)$—$A(x)$
—$B(x)$—$A(x)$—$B(x)$— as for example in connection with a polystyrene-polyoxyethylene copolymer where A represents the polystyrene polymeric units and B the polyoxyethylene polymeric units. In connection with a graft copolymer having a trunk polymer $A(x)$ and graft branches $B(x)$, the polymeric units $B(x)$ will join to the trunk polymer $A(x)$ forming side polymer branches, as for example in connection with polystyrene branches grafted on a polymethylmethacrylate trunk. These graft copolymers may be considered sequenced as there is a length of trunk polymer molecule and a branched polymer chain, a further length of trunk polymer, a branch polymer chain, and so on. While for purposes of illustration, copolymers formed of two different polymeric units have been described, the copolymers may be formed of three or more different polymeric units which are joined in the form of a copolymer in a similar manner.

As a solvent for forming the mesomorphic phase gel, any solvents which will not destroy the copolymer molecules, as for example by chemical reaction, and in connection with which one of the polymeric units per se of the copolymer would be more difficultly soluble than the other may be used.

When the sequenced copolymer forms a gel in this solvent, the more readily soluble polymeric units concentrate in the solvent phase and the more difficultly soluble polymeric units concentrate as layers, rods, or spheres forming the mesomorphic structure which in a sense may be considered as intermediate between a crystalline structure and a completely amorphous structure. As contrasted to crystalline structures, the mesomorphic structures do not show the fixed three dimensional spatial relationship between the vibratory atom paths of the crystal lattice and as contrasted to amorphous structure show double refraction and optical anisotropy.

Certain molecular structures may be characterized as smectic and others as nematic. In the former the molecules are arranged in parallel and equidistant layers while in the latter, the molecules are arranged in a manner so that the optical axis is parallel and has a common direction.

In connection with mesomorphic gels, the macromolecules of the polymers may assume one of several types of configurations which may be designated as laminar, cylindrical and spherical.

In connection with laminar configurations, the macromolecules arrange themselves in alternate parallel layers. Thus, for example in connnection with a gel obtained from copolymer A—B in solvent S, where A is relatively soluble and B is relatively insoluble, parallel layers which predominantly contain macromolecules type B will form between which will form layers of the solvent S containing macromolecules of the type A. In each layer the macromolecules A and B will retain the normal configuration which the same would have had if they had not been copolymerized together. The thickness of the layer depends upon the nature of A and B, on their degree of polymerization and the nature of the liquid solvent S, the composition of the mixture and on the temperature. The thickness of the layer will generally vary between about 50 and 200 Angstrom units and sometimes even more. Thus, for example a mixture of 21 parts by weight of butyl phthalate and 79 parts by weight of a block copolymer of the type B—A—B in which A is a polystyrene chain with a degree of polymerization of 184 and B is a polyoxyethylene chain with a degree of polymerization of 186 will form a mesomorphic gel which has a laminar structure at ambient temperature with the thickness of the polyoxyethylene layer being about 82 Angstrom units and the thickness of the butyl phthalate layer containing the polystyrene being about 152 Angstrom units. The polyoxyethylene in its own layer assumes a configuration which is normal for polyoxyethylene-homopolymer and is crystalline. The polystyrene assumes a random configuration which is normal for a solution of polystyrene homopolymer in butyl phthalate.

The thicknesses of the laminae may be measured, for example, by X-ray diffraction techniques.

If, on the other hand, the degree of polymerization of the polystyrene chain is 55, and that of the polyoxyethylene chain is 175, the thickness of the polyoxyethylene layer will be 67 Angstrom units and that of the butyl phthalate solvent containing the polystyrene will be 85 Angstrom units.

In a cylindrical configuration, the relatively insoluble polymeric portions of the copolymers form cylinders which are parallel to each other, are of an indefinite length, and form a general hexagonal over-all relative arrangement with the space between the cylinders being occupied by the solvent mixed with the relatively soluble polymeric units of the copolymer. Each of these polymeric copolymer parts assumes a configuration which the same would normally assume if they were homopolymers and not copolymers.

The diameter of the cylinders and the distance between them depends on the nature of the polymeric copolymer parts A and B, on their degree of polymerization, and the nature of the solvents, the composition of the mixture, and the temperature. The diameter of the cylinders and the distance which separates them may vary between 50 to at least 200 Angstrom units and more. Thus, for example, a mixture of 39 parts by weight of nitromethane and 61 parts by weight of a block copolymer formed of the units A and B in which A is polystyrene with a degree of polymerization of 184 and B is polyoxyethylene with a degree of polymerization 93, forms a mesomorphic gel whose structure is cylindrical at ambient temperatures. The diameter of the cylinder formed by polystyrene portions of the macromolecule is 150 Angstrom units and the distance which separates the axis of two adjacent cylinders is 200 Angstrom units. The space between the cylinders is filled by an inter-mixture of polyoxyethylene and nitromethane. The polyoxyethylene assumes the configuration which is normal for polyoxyethylene homopolymer dissolved in nitromethane which configuration is random, and the polystyrene assumes an amorphous configuration which is normal for polystyrene homopolymer.

In a spherical configuration, the relatively insoluble polymeric parts of the copolymer arrange themselves as spheres forming a compact face-centered cubic structure with the space between the spheres being occupied by the relatively soluble polymeric part of the copolymer intimately mixed with the solvent. Thus, again, using a copolymer A and B and solvent S, for illustration, the parts B will form the sphere and the parts A with the solvent S the phase between the spheres. Each of the parts A and B would assume the configuration that the same would assume as a homopolymer rather than a portion of a copolymer.

The diameter of the spheres and the distance between them depends on the nature of A and B, on their degree of polymerization and on the nature of the liquid S, the composition of the mixture and the temperature. The diameter of the spheres and the distance which separates them may vary from between 50 to at least 200 Angstrom units or more.

For example, if a mixture of 30 parts of water and 70 parts of a block copolymer of the type:

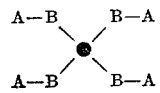

in which A is a polyoxyethylene chain with a degree of polymerization of 17 and B is a polyoxypropylene chain with a degree of polymerization of 13 and will form a mesomorphic gel having a spherical configuration at ambient temperatures. The spheres will be formed of the polyoxypropylene portion of the copolymer and will have a diameter of 81 Angstrom units. The length of the side of the face-centered cubes is 149 Angstrom units. The space which separates the spheres is filled with an intimate mixture of the polyoxyethylene portion of the copolymer in water.

The polyoxyethylene assumes the normal random configuration for polyoxyethylene homopolymer dissolved in water and the polyoxypropylene assumes the normal amorphous configuration of polyoxypropylene homopolymer of the same degree of polymerization.

In accordance with the invention, it has been discovered that the mesomorphic gels may be rigidified to a usable form without a destruction of the mesomorphic molecular structure.

In accordance with the invention, the rigidification is effected by cross-linking the copolymer molecules in the gel, either directly or by means of a cross-linking agent, such as a vulcanization agent, or by solidifying or thickening the solvent phase as for example by polymerization in which connection there is used as the solvent a material which is or contains a polymerizable monomer.

The initial mesomorphic phase gel is formed by dissolving a sequenced copolymer in a solvent in which the polymeric units forming the copolymer have different solubilities.

The starting sequenced copolymers may be any of the known block or graft copolymers as for example of the polyvinyl, polydiene, polyoxyalkylene, polyamide, or polyester types which may, for example, be of the isotactic, atactic, stereoregular, etc. configurations. Specific examples of suitable sequenced copolymers, which is in no sense limiting, includes:

polystyrene-polymethylmethacrylate,
polystyrene-polyisoprene,
polystyrene-polyoxyethylene,
polyisoprene-polyoxyethylene,
polyoxyethylene-polyoxypropylene,
polystyrene-polybromostyrene,
polystyrene-polyvinyl-2-pyridine,
polystyrene-chlorhydrate of polyvinyl-2-pyridine,
polystyrene-polymethacrylonitrile,
polyisoprene-1,4-cis-polyisoprene,
polystyrene grafted on polymethylmethacrylate,
polystyrene graft on polyamide and the like.

The degree of polymerization of the individual polymetric components of the copolymer is not critical and may vary from 10 or even less to 100 or more.

The starting copolymers may be obtained in the conventional and well known manners as for example by anionic polymerization or by the use of high energy ionizing radiation in connection with graft copolymerization by coupling of preformed macromolecule chains or the like, all of which is conventional and well known in the art.

It has been found preferable to choose sequenced copolymers in which the sequenced polymeric units have very different properties, as for example with regard to solubility, miscibility, crystallinity, etc.

Thus, for example a block copolymer of polystyrene and polyoxyethylene is highly suitable because the properties of the polystyrene are very different from those of the polyoxyethylene, the former being amorphous and non-polar while the latter will form crystals and is highly polar. Furthermore polystyrene and polyoxyethylene are non-miscible. A block copolymer of polystyrene and quarternary poly-4-vinyl pyridinium chloride may also be given as a preferable example as in this case one of the polymeric units is non-ionic while the other is an electrolyte.

When the other characteristics of the polymeric sequence of the copolymers are sufficiently different, the molecular weight of the two sequences does not have to be very high. Thus, for example, in the case of a block copolymer of polystyrene, polyoxyethylene, the sequences may have a molecular weight of 1,000 or less. If, however, the sequences have similar properties, the molecular weights thereof should preferably be higher. Thus, for example, in the case of a block copolymer of polystyrene, polymethylmethacrylate, the sequences should preferably have a molecular weight greater than 50,000.

Generally, if the molecular weights of the sequences are of the same order of magnitude, their ratio should be between about .1 and 10. In connection with graft copolymers, the molecular weight of the side chain should preferably be of the same order of magnitude as the molecular weight of that part of the backbone polymer between two adjacent side chains. As for example, in connection with a block copolymer of the type B—A—B, A may be polystyrene with a molecular weight of about 19,300 and B polyoxyethylene with a molecular weight of 4,100. In connection with polymethylmethacrylate of a molecular weight of 500,000 having 10 side chains of polystyrene, the molecular weight of each side chain should preferably be equal to 50,000.

The solvents used to form the mesomorphic gels may be any liquid solvent in which the polymeric sequences of the copolymers have differential solubilities and which will not destroy the copolymer as for example by chemical reaction. Thus, for example, while performic acid is a suitable differential solvent for polyisoprene-polyoxyethylene copolymer and may form a mesomorphic gel in combination therewith, the performic acid is a powerful oxidizing agent which will degrade the polyisoprene.

It is, of course, well within the skill of the art to determine which liquids will show this differential solvent power for the polymeric sequences of the copolymer and which will not destroy the copolymer; preferably the solvent should be a good solvent for one of the sequences and a poor solvent for the other. Examples given by way of illustration and not limitation include: benzene for polystyrene-polymethylmethacrylate, copolymer, water for polystyrene-poly-4-vinyl pyridinium chloride copolymer, diethylether for polystyrene-polyoxyethylene copolymer, acetic acid for polystyrene-polymethylmethacrylate copolymer.

All these solvents constitute excellent solvents for one of the sequences in which the other of the sequences is relatively insoluble. While this marked difference in solubility is preferred, the same is not necessary and it is possible to use solvents which dissolve both of the sequences but which, nevertheless, show a preferential affinity for one as compared to the other, as for example, ethyl benzene for polystyrene, polyoxyethylene copolymer.

The chemical nature of the solvent per se is immaterial provided that under the conditions of the gel formation, the same is capable of maintaining a liquid phase.

Examples of the type of liquids which may be used include: hydrocarbons such as octane isoprene, butadiene, etc., cyclohexane, decaline, styrene, divinyl benzene, and the like; ethers: such as diethyl ether, dibutyl ether, methylvinyl ether, and the like; alcohols, such as methanol, ethanol, propanol, allylic alcohol, and the like; ketones such as acetone, cyclohexanone, methylvinylketone, and the like; acids, such as formic acid, acetic acid, acrylic acid, and the like; esters, such as diethyl acetate, butyl phthalate, methylmethacrylate, vinylacetate, and the like; and various other materials such as water, nitromethane, ethylene oxide.

The fact that a material may not be liquid at ambient temperature and pressure does not exclude the same. Thus, for example, it is possible to use the normally gaseous butadiene as a solvent for polybutadiene-polyoxyethylene copolymer by operating at a temperature of −20° C. or at a pressure of 10 atmospheres.

The solvents may be used as such or in admixture with other solvents or materials, as for example mixtures of acetic acid and dichloroacetic acid, styrene, and divinyl benzene, water, and acetic acid, all of which are, for instance, suitable for use with the copolymer of polystyrene and polyoxyethylene.

It is also possible to utilize a mixture of two mutually immiscible liquids in the formation of the mesomorphic gel. In this case, one of the liquids should preferentially dissolve one of the polymeric sequences of the block copolymer, and the second liquid should be miscible with the other polymeric sequence of the copolymer. Thus, for example, water and styrene may be added to a block copolymer of polystyrene-polyoxyethylene, with the water dissolving the polyoxyethylene and the styrene dissolving the polystyrene.

It is also feasible to use a solution of a gas, a solid, or another liquid in a liquid as the solvent provided that the end solution meets the other requirements for the solvent as set forth above. Thus, for example, a solution of sodium chloride in water may be used in connection with a polyisoprene-polyoxyethylene copolymer.

The quantity of the solvent used to form the mesomorphic gel may be very easily empirically determined. A certain minimum requirement is required to form the gel. This may be empirically determined by small amounts of the solvent in increments until the mesomorphic gel is formed. The formation of the gel may be very easily determined using a microscope with polarized light as the gel is birefringent. After a certain maximum quantity of the liquid is added, the material may become too fluid, and the gel structure lost which also may be very easily determined in the same manner. Generally, an amount of less than about 50% by weight of the solvent, based on the total weight of the mixture, is suitable for forming the mesomorphic gel. Under certain very special conditions, it is possible to form a mesomorphic structure without the liquid solvent. Thus, in the case of polystyrene-polyoxyethylene copolymers, it is possible to form the mesomorphic gel using ethyl benzene as the solvent, and then to remove the solvent by evaporation without destruction of the mesomorphic structure. It is even possible to obtain the mesomorphic structure by melting the copolymer and slowly cooling. Within the broadest aspect of the invention, such gels may be rigidified as for example by cross linking.

The particular structure that the mesomorphic gel will have will depend upon the nature of the copolymer, the nature and composition of the liquid solvent, and the temperature. Thus, for example, block copolymers of polystyrene-polyoxyethylene, utilizing a hydrocarbon solvent, will form a laminar structure.

While a block copolymer of polystyrene-polyoxyethylene will form a laminar structure, when using a solvent preferential for the polystyrene, as for example ethyl benzene, vinyl acetate, diethyl ether, etc., a cylindrical structure is obtained with a liquid which shows a preferential solubility for the polyoxyethylene, as for example: water, acetic acid, nitromethane, etc.

When a block copolymer of polystyrene, polyoxyethylene, in which each sequence has a degree of polymerization of 75, is gelled in acrylic acid, a laminar structure results if the acrylic acid content is less than 10% but a cylindrical structure is obtained where the acrylic acid content is between 15–50%.

The temperature used must be a temperature at which the solvent is a liquid under the operating conditions of pressure and the temperature should not be so high that the mesomorphic gel structure is destroyed. Temperatures at which this destruction occurs can be very easily empirically determined, as for example in connection with a laminar mesomorphic gel formed of polystyrene, polyoxyethylene copolymer with 20% butylphthalate, the structure becomes destroyed at temperatures above 36° C.

The structures of the mesomorphic gel and the dimensions of the layers, cylinders, spheres, or the like may be readily determined by known techniques, as for example by X-ray difraction techniques or the like. After the gels have been rigidified in accordance with the invention, the structure may be observed with an electron microscope. The dimensions of the layers, cylinders, etc. in the gels depend on the molecular weight of the sequences and the composition and type of the polymer, and on the compositions of the system in the liquid S. These values can be calculated and by choosing for a given polymer a molecular weight of the sequences and the quantity of liquid added, it is possible to fix the structural dimensions of the gel, and thus the physical properties.

It is possible, in accordance with the invention, as desired to rigidify the mesomorphic gel, either throughout its entire mass or solely at its surface.

One mode for rigidification of the mesomorphic gels, in accordance with the invention, is by cross-linking utilizing a cross-linking agent, as for example, a vulcanization agent.

As cross-linking agents, the conventional difunctional compounds and vulcanization agents capable of forming cross-linking bonds between the copolymer molecules or portions thereof may be used. These cross-linking agents may be used where applicable and in a suitable form as the liquid solvent for forming the gel or may be incorporated in such a solvent. Thus, for example, $Cl_2S_2$ may be used as a solvent forming a mesomorphic gel and after the gel has formed, the same will become vlucanized after a period of time, and thus rigidified. The $Cl_2S_2$ may, for example, be used in connection with polyisoprene-polyoxyethylene copolymers.

It is also possible, in accordance with the invention, to rigidify the mesomorphic gel by directly linking the polymer units forming the gel, as for example, utilizing any known or conventional cross-linking radiation. In this connection cross-linking activators or sensitizers, if necessary or desirable, may be incorporated into the solvent. Thus, high energy ionizing radiation, as for example, X-rays or gamma rays from conventional sources, may be used for cross-linking most polymers, and ultra-violet light may be used for cross-linking many polymers and other further polymers in the presence of sensitizers. The use of radiation for cross-linking is well known in the art, and the conventional techniques and dose may be used for the rigidification in accordance with the invention.

The rigidification of the mesomorphic gels, in accordance with the invention, may also be effected by polymerizing a monomer which has been incorporated in the gel. This monomer where suitable is preferably in the form of a liquid used as a solvent for forming the gel. Thus, the monomer acrylic acid may be used as the solvent in forming a cylindrical mesomorphic gel from a polyoxyethylene-polystyrene copolymer; the monomer methylmethacrylate may be used in forming a laminar mesomorphic gel from a poly-p-bromostryene-polyoxyethylene copolymer.

It is also possible to use monomers which are normally gaseous as the solvents by operating under suitable temperature and pressure conditions. Thus, for example, the monomer butadiene may be utilized under conditions which will cause liquification thereof, as for example pressure or low temperature. Thus, butadiene may be used under pressure to form a laminar mesomorphic gel from polybutadiene, polyoxyethylene copolymers. It is also possible to incorporated a monomer in the solvent used for forming the mesomorphis gel whether or not the monomer is miscible with this liquid, as for example when using water to form a cylindrical mesomorphic configuration from a polystyrene-polyoxyethylene copolymer, styrene may be added as the monomer. If the monomer is normally solid, the same may be dissolved either in the solvent used to form the mesomorphic gel or in another solvent which is then added to the solvent used to form the gel. Thus, for example, an aqueous solution of sodium methacrylate may be used to form a gel from a polystyrene-polyoxyethylene copolymer.

In certain instances, it is interesting to add a second liquid to the monomer, even when the monomer is capable of serving the dual function as solvent for forming the mesomorphic gel. Such second liquid may be used to impart special characteristics to the polymerization product of the monomer, as for example a greater plasticification or greater elasticity. Thus, for example butylphthalate may be added as a plasticizer to methylmethacrylate which is used to form a mesomorphic gel from a polyoxyethylene-polystyrene copolymer.

The monomer may be polymerized in the conventional and well known manner, as for example with the use of actinic radiation or by incorporation of a suitable polymerization catalyst in the gel. Thus, for example, in connection with gels containing methylmethacrylate, polymerization may be induced by ultra-violet irradiation. A catalyst, such as borotrifluoride in concentrations, as for example of 1% may be used to polymerize the monomer isoprene and azobis-isobutylnitrile may be used as catalyst in concentration of about 1% to polymerize methacrylanitrile in a gel.

The rigidification of the gel, in accordance with the invention, occurs with a preservation of the mesomorphic structure. This permits the practical utilization of the particular properties of the mesomorphic gels which could not be normally utilized because of the fluidity of the gels, the fragility of this structure, their temperature, and chemical sensitivity, etc.

The rigidified gels with mesomorphic structure constitute polymers of extremely interesting and useful mechanical properties. By a suitable selection of the copolymers and the mesomorphic form, the strength, elasticity, shock-resistance, etc. may be greatly improved as compared to the normal copolymers. The rigidified gels, in accordance with the invention, can also be produced in the form of polymers showing extremely interesting optical properties. Thus, for example, by incorporating a fluorescent material in the solvent from which the gel is formed, the end polymer will retain a fluorescent material in the domains of its structure between the layers, cylinders, or spheres, depending on the structure, and show interesting optical properties.

It is also possible to dye a normally difficultly dyeable polymer by fixing the chromophoric groups of the dye on the polymer.

By choosing the degree of polymerization of the sequences of the block copolymer or the side chains in the graft copolymer used to form the mesomorphic gel, it is possible to synthesize a structure whose dimensions, as for example with respect to the laminar layers, have the same order of magnitude as the wave lengths of visible light and which thus may be used for refraction purposes or to obtain products which have a very intense reddish-brown tinge.

It is furthermore possible to produce polymers which have extremely high heat-resistance by incorporating a small quantity of a thermo-resistant polymer in the gel structure.

The regular spacing of the molecular structure of the polymers, in accordance with the invention, will impart the same very interesting electrical and photocharacteristics. By incorporation of semi-conducting materials, it is possible, for example, to produce semi-conductors.

In the case of those regularly arranged polymers, in accordance with the invention, whose structure is laminar, and whose alternate layers are of conducting and dielectric material, the same constitute extremely powerful condensers which, with respect to their particular thickness, have an extremely large capacity. This can be well appreciated when considering that the thickness of the layers can be as small as 100 Angstroms, and their surface area is unlimited.

The following examples are given by way of illustration and not limitation:

EXAMPLE 1

A mixture of 30 parts of butadiene and 70 parts of a block copolymer consisting of a succession of chains, one being a polybutadiene chain with a degree of polymerization of 100, the other being a polyoxyethylene chain with a degree of polymerization of 150 and 0.5% $BF_3$, gives, at ordinary temperatures and under a pressure of 10 atmospheres, a mesomorphic gel whose structure is laminar. Polymerization of butadiene occurs under the influence of the 0.5% $BF_3$ inside the gel, and a polymeric product is obtained whose structure is still laminar and which results in an alternate stacking up of layers of polybutadiene and crystallized polyoxyethylene. The polybutadiene layers preserve their usual elasticity; the polyoxyethylene layers preserve their crystalline rigidity; the over-all polymer exhibits the sum of these two properties: great elasticity, good stability and an overall deformability which is less than that of a pure polybutadiene sample. These polymers are good shock-absorbers with respect to mechanical vibrations.

By increasing the degree of polymerization of the sequences of polybutadiene of the original block copolymer, the elastic properties of the polymer thus obtained are increased; by increasing the degree of polymerization of the sequences of polyoxyethylene of the original block copolymer, the deformability properties of the polymer thus obtained are decreased.

EXAMPLE 2

A mixture of 20 parts of acrylic acid and 80 parts of a block copolymer consisting of a succession of sequences of polystrene and polyoxyethylene with a degree of polymerization of 100, gives a gel which has a cylindrical configuration at ordinary temperatures. Exposing this gel to ultra-violet irradiation from a mercury vapor lamp initiates the polymerization of the acrylic acid and leads to a product which is resistant to heat at temperatures as high as 250° C.: the structure of the cylinders remains stable up to 250° C., at which temperature the whole structure of the gel fuses. This thermoresistance is due to the infusible polyacrylic acid.

EXAMPLE 3

32 parts of acrylic acid and 68 parts of a block copolymer consisting of an alternating succession of only two chains, one being a polyoxyethylene chain of a degree of polymerization of $n=175$ and the other being a polystyrene chain of a degree of polymerization of $n=55$ are admixed at room temperature to form a mesomorphic gel charactertized by a cylindrical structural arrangement. The inner portions of the cylinders are occupied by the polystyrene component and the interspace between the cylinders occupied by an intimate admixture of the polyoxyethylene component with the acrylic acid. The gel-like product is spread upon the surface in the form of a 1 mm. thick strip after addition to the gel of 0.32 part of azo-bisisobutyronitrile which serves as photosensitizer and the strip of gel is exposed for 48 hours at 16° C. under exclusion of air to ultra-violet radiation from a mercury vapor lamp. There is thereby obtained the polymerization of the acrylic acid, the gel becoming, as a result, solid and rigid. The mesomorphic structure established in the gel phase remains unchanged. The structural parameters of the gel after polymerization are as follows: Distance between centers of 2 adjacent cylinders 152 Angstroms; diameter of the cylinders 105 Angstroms.

EXAMPLE 4

A mixture of 95 parts of a block copolymer of polyisoprene-polyoxyethylene which consists of a succession of only two chains, where one (polyisoprene) has a degree of polymerization $n=100$, and the other (polyoxypropylene) has a degree of polymerization $n=120$, and 5 parts of $Cl_2S_2$, gives at ambient temperature a mesomorphic gel which has a laminar structure. Upon standing, the gel becomes vulcanized though the laminar structure remains preserved.

EXAMPLE 5

Mixing of 30 parts of diethyl ether and 70 parts of a block copolymer consisting of a succession of two chains only, one being a polystyrene chain or degree of polymerization of 140, the other being a polyoxyethylene chain with a degree of polymerization of 80, gives at ordinary temperatures a mesomorphic gel with a laminar structure. Exposing this gel to a 1000 Curie cobalt source, a dose of 4 megaroentgen, results in cross-linking of polyoxyethylene. The gel is thus solidified without its structure having been modified. Elimination of the diethylether, by evaporation, leaves a stable polymer whose structure is the same as that of the initial gel.

EXAMPLE 6

By mixing 32 parts of acrylic acid and 68 parts of a block copolymer consisting of a succession of two chains; one of the chains is polyoxyethylene with a degree of polymerization of 175 and the other is a chain of polystyrene with a degree of polymerization of 55, a mesomorphic gel is formed which has a cylindrical configuration. The acrylic acid is then polymerized forming a physically rigid polymer.

EXAMPLE 7

25 parts of butadiene and 75 parts of a block copolymer, consisting of a succession of 2 chains; one of the chains is polybutadiene with a degree of polymerization of 200 and the other chain is polyoxyethylene with a degree of polymerization of 300, are mixed under a pressure of 10 atmospheres, and a mesomorphic gel whose configuration is laminar is obtained. The butadiene is then polymerized forming a rigid polymer.

EXAMPLE 8

On mixing 10 parts of styrene with 90 parts of a block copolymer consisting of a succession of 2 chains, one being a chain of polystyrene with a degree of polymerization of 55, the other being a polyoxyethylene chain with a degree of polymerization of 175, there is obtained a mesomorphic gel whose structure is laminar. To induce a cylindrical configuration, it suffices to add 30 parts of water. The styrene is then polymerized to polystyrene forming a rigid structure.

EXAMPLE 9

On mixing 30 parts of an aqueous solution containing 5% of sodium methacrylate and 70 parts of a block copolymer consisting of a succession of two chains, where one chain is polystyrene with a degree of polymerization of 200, the other being a polyoxyethylene chain with a degree of polymerization of 100, one thus obtains a mesomorphic gel whose configuration is cylindrical. The gel is then subjected to high energy ionizing radiation utilizing a 1,000 Curie cobalt source with a dose of about 5 megaroentgen units which results in the formation of a rigid gel.

EXAMPLE 10

40 parts of a butylphthalate solution containing 80% of methyl methacrylate are mixed with 60 parts of a block copolymer consisting of a succession of two chains; one of the chains is polyoxyethylene with a degree of polymerization of 100, the other is a chain of polystyrene with a degree of polymerization of 200. A mesomorphic gel, with a laminar structure, is formed. After polymerizing the methyl methacrylate in the gel, one obtains a product which is much more plastic than would be the case if the initial mesomorphic gel had not contained any butylphthalate.

While the invention has been described with reference to certain specific embodiments, various changes which fall within the spirit of the invention and scope of the appended claims will become apparent to the skilled artisan. The invention is only intended to be limited by the

We claim:

1. A physically rigid polymer structure essentially consisting of a rigidified block or graft copolymer in the mesomorphic phase retaining the molecular orientation of a liquid crystal.

2. A physically rigid polymer structure essentially consisting of a rigidified block copolymer in the mesomorphic phase retaining the molecular orientation of a liquid crystal.

3. A physically rigid polymer structure essentially consisting of a rigidified graft polymer in the mesomorphic phase retaining the molecular orientation of a liquid crystal.

4. A polymer structure essentially consisting of a block or graft copolymer in the mesomorphic phase cross-linked into a rigidified structure retaining the molecular orientation of a liquid crystal.

5. A polymer structure essentially consisting of a block or graft copolymer in the mesomorphic phase cross-linked through a cross-linking agent into a rigidified structure retaining the molecular orientation of a liquid crystal.

6. A polymer structure essentially consisting of a block or graft copolymer in the mesomorphic phase with the solvent phase of the mesomorphic structure containing a polymerizing monomer forming a rigidified structure retaining the molecular orientation of a liquid crystal.

7. A polymer structure essentially consisting of a block or graft copolymer in the mesomorphic phase, the solvent phase of the mesomorphic structure being polymerized into a rigidified structure retaining the molecular orientation of a liquid crystal.

8. A polymer structure essentially consisting of a block or graft copolymer in the mesomorphic phase the solvent phase of the mesomorphic structure being polymerized to substantially a solid form while retaining the molecular orientation of a liquid crystal.

9. A polymer structure essentially consisting of a copolymer selected from the group of (a) block copolymers consisting of polystyrene-polyoxyethylene, polystyrene - polymethylmethacrylate, polystyrene - polyisoprene, polyisoprene-polyoxyethylene, polyoxyethylene polyoxypropylene, polystyrene-polyoxypropylene, polystyrene-polybromostyrene, polystyrene-polyvinyl-2-pyridine, polystyrenechlorhydrate of polyvinyl-2-pyridine, polystyrene-polymethacrylonitrile, polyisoprene-1, 4, cis-polyisoprene block copolymers, and (b) of the graft copolymers polymethylmethacrylate polystyrene and polyamide polystyrene in the mesomorphic phase cross-linked into a rigidified structure retaining the molecular orientation of a liquid crystal.

10. A polymer structure essentially consisting of a copolymer selected from the group of (a) block copolymers consisting of polystyrene-polyoxyethylene, polystyrene-polymethyl-methacrylate, polystyrene-polyisoprene, polyisoprene - polyoxyethylene, polyxyethylene-polyoxypropylene, polystyrene-polyoxypropylene, polystyrene-polybromostyrene, polystyrene-polyvinyl-2-pyridine, polystyrenechlorhydrate of polyvinyl-2-pyridine, polystyrene-polymethacrylonitrile, polyisoprene-1,4-cis; polyisoprene block copolymers, and (b) of the graft copolymer's polymethylemethacrylate polystyrene and polyamide-polystyrene in the mesomorphic phase, the solvent domains of the mesomorphic structure being in the form of a substantially solidified polymer while retaining the molecular orientation of a liquid crystal.

11. Method for producing a polymer structure having a mesomorphic phase which comprises cross-linking the macro-molecules of a mesomorphic phase gel formed of a block or graft copolymer in a solvent having a differential solubility for the blocks or trunk and grafts of said copolymer while retaining the molecular orientation of a liquid crystal.

12. Method for producing a polymer structure having a mesomorphic phase which comprises mixing a block or graft copolymer in a solvent having a differential solvent power for the blocks or trunk and grafts of said copolymer to thereby form a mesomorphic phase gel, and thereafter cross-linking the polymer with actinic radiation while retaining the molecular orientation of a liquid crystal.

13. Method for producing polymer structures having a mesomorphic phase which comprises mixing a block or graft copolymer in a solvent having a differential solvent power for the blocks or trunk and grafts of said copolymer to thereby form a mesomorphic gel, incorporating a cross-linking agent in said gel and cross-linking the polymer with said cross-linking agent while retaining the molecular orientation of a liquid crystal.

14. Method according to claim 13 in which said cross-linking agent is a vulcanization agent.

15. Method for producing polymer structures which comprises incorporating a polymerizable monomer in the solvent phase of a mesomorphic phase gel formed of a block or graft copolymer in a solvent having a differential solvent power for the blocks or trunk and grafts of said copolymer and thereafter polymerizing the monomer while retaining the molecular orientation of a liquid crystal.

16. Method according to claim 15 in which said solvent is in the form of a polymerizable monomer.

17. Method for producing polymer structures which comprises mixing a block or graft copolymer with a solvent having a differential solvent power for the blocks or trunk and grafts of said copolymer and containing a polymerizable monomer to thereby form a mesomorphic phase gel and thereafter polymerizing said monomer while retaining the molecular orientation of a liquid crystal.

18. Method for producing polymer structures which comprises mixing a block or graft copolymer with a polymerizable monomer comprising a solvent having a differential solvent power for the blocks or trunk and grafts forming said copolymer to thereby form a mesomorphic phase gel, and thereafter polymerizing said monomer while retaining the molecular orientation of a liquid crystal.

19. Method according to claim 18 which includes incorporating a plasticizer in said monomer.

References Cited

UNITED STATES PATENTS

| | | | |
|---|---|---|---|
| 2,959,569 | 11/1960 | Warrick | 260—46.5 |
| 3,029,216 | 4/1962 | Bailey et al. | 260—42 |
| 3,041,310 | 6/1962 | Luftglass et al. | 260—876 |
| 3,095,388 | 6/1963 | Osmond et al. | 260—4 |

OTHER REFERENCES

Ballantine: BNL Report No. 414 (October 1956), pp. 1–14.

SAMUEL H. BLECH, *Primary Examiner.*

JAMES A. SEIDLECK, MURRAY TILLMAN, *Examiners.*

N. W. SHUST, W. L. BASCOMB, D. J. BREZNER, *Assistant Examiners.*